H. E. WARREN.
MECHANISM FOR MEASURING AND INTEGRATING THE AMOUNT OF FLOW OF WATER THROUGH TURBINE GATES.
APPLICATION FILED JAN. 28, 1914.
1,156,042.
Patented Oct. 5, 1915.
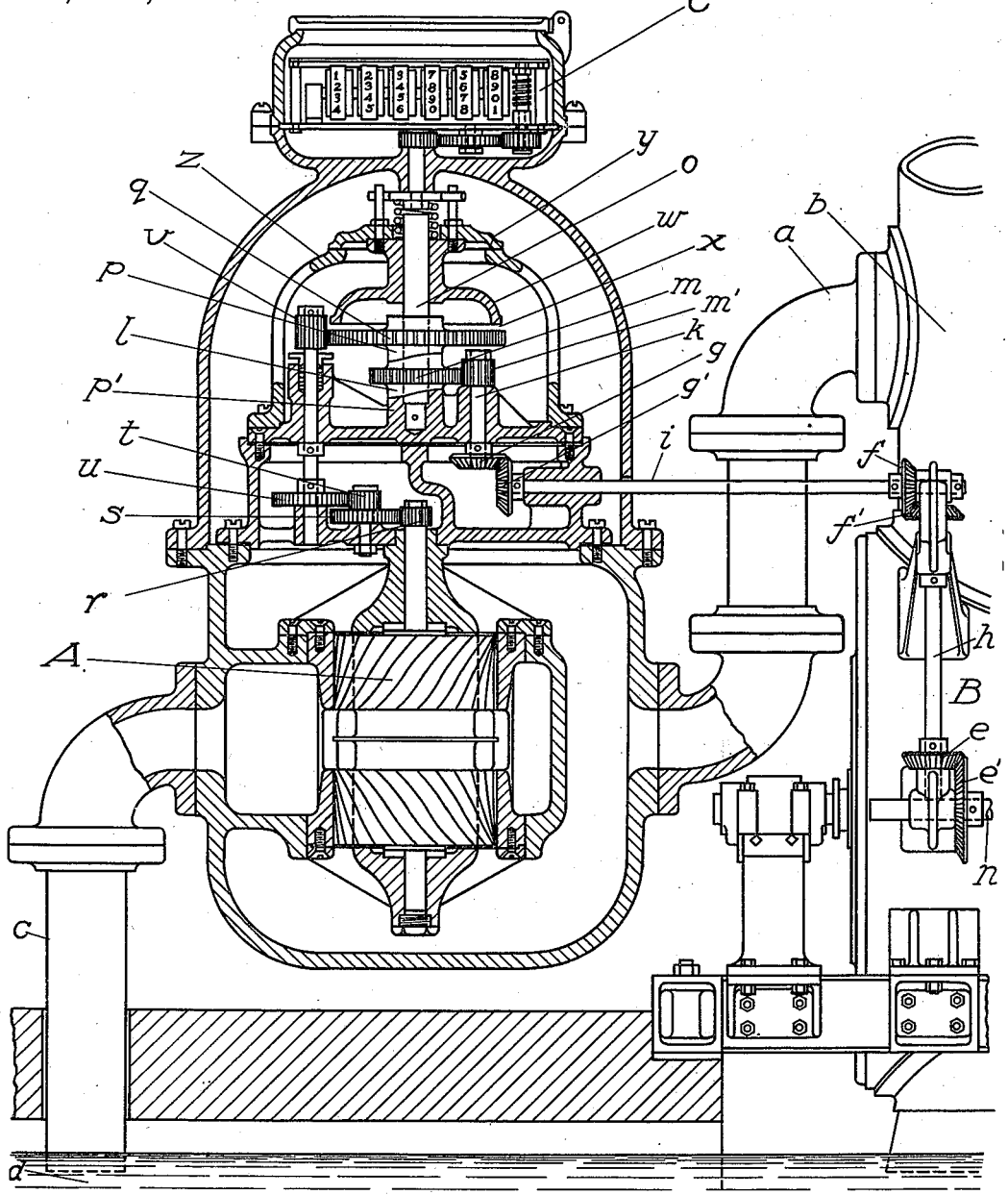
WITNESSES:
Charles S. Woodbury
Florence A. Collins
INVENTOR.
Henry E. Warren,
BY Reuben L. Roberts.
ATTORNEY.

UNITED STATES PATENT OFFICE.

HENRY E. WARREN, OF ASHLAND, MASSACHUSETTS, ASSIGNOR TO THE LOMBARD GOVERNOR COMPANY, OF ASHLAND, MASSACHUSETTS, A CORPORATION OF NEW JERSEY.

MECHANISM FOR MEASURING AND INTEGRATING THE AMOUNT OF FLOW OF WATER THROUGH TURBINE-GATES.

1,156,042.　　　　Specification of Letters Patent.　　　Patented Oct. 5, 1915.

Application filed January 28, 1914. Serial No. 815,089.

*To all whom it may concern:*

Be it known that I, HENRY E. WARREN, a citizen of the United States of America, residing at Ashland, in the county of Middlesex and Commonwealth of Massachusetts, have invented Improvements in Mechanism for Measuring and Integrating the Amount of Flow of Water Through Turbine-Gates, of which the following is a specification.

This invention relates to apparatus for measuring and integrating the amount of flow of water through turbine gates. Hitherto such apparatus has been very crude and unsatisfactory.

This invention consists in means by which, in a simple and accurate manner the total quantity of water flowing past the gates of the turbine may be read at any time without making computations for variation in head, gate-opening, etc.

The drawing shows a vertical section of the apparatus with the gears and shafts in elevation; also a portion of the penstock and of the casing of the turbine in elevation.

As illustrated in the drawings, this desirable result may be accomplished by employing a very small turbine or water motor A supplied through a pipe $a$ from the penstock $b$ of the main turbine B. The speed of A is not regulated in any way but depends merely upon the velocity of the water passing through the pipe $a$ and out of the turbine through the draft tube $c$ to the tail race $d$. The velocity of A will consequently vary directly with the velocity of water through $a$, which in turn will vary with the square root of the total head. The quantity of water used per minute by the main turbine B for any given gate opening, as is well known, will vary also with the square root of the total head; consequently the speed of the miniature turbine A will vary directly with the rate of flow to the turbine B if the gate opening of B remains constant.

In order to indicate the variations in the gate opening of B, there is provided a connection consisting of bevel gears $e$, $e'$, $f$, $f'$, $g$, $g'$, and the connecting shafts $h$ and $i$ to a short shaft $k$ which drives a double faced cam $l$ through gears $m$ and $m'$; consequently for any movement of the gates of the turbine B, which are connected to shaft $n$, the double cam $l$, which revolves loosely upon the shaft $o$, will be rotated in one or the other direction. Revolving loosely upon this shaft $o$, is another single faced cam $p$ forming part of the hub of the gear $q$. $q$ receives rotation through the train of gears $r$, $s$, $t$, $u$, and $v$ from the miniature turbine A so that the gear $q$ is constantly revolving very much slower, but at a rate proportional to the speed of A. Mounted loosely upon the shaft $o$ there is also a double friction wheel $w$ with friction faces $x$ and $y$. Face $y$ normally rests upon the fixed surface $z$ and during such contact restrains $w$ from revolving. In the course of the revolution of $q$ this gear has also a rise and fall in an axial direction, due to the contact of the cam surfaces $l$ and $p$. When this axial motion is sufficient the upper face of the gear $q$ engages the friction face $x$, and lifting $w$ free from $z$, causes a slight rotation of $w$, until, owing to the downward axial motion of $q$, contact is again made between $y$ and $z$, and $w$ instantly stops.

The lower cam surface of $l$ resting against a fixed cam surface $p'$ may, if gear $m$ is revolved, raise or lower the average vertical position of gear $q$ and consequently increase or decrease the amount of rotation of $w$ produced by each revolution of $q$. These cam surfaces are so constructed that when the water wheel gates are closed, the position of $m$ will be so low that $q$, as it revolves, does not cause any motion whatever of $w$, but as the power output of the turbine B is increased by opening its gates, the double cam $l$ will be raised by moving up on the surface of $p'$, and will, thereby, increase in predetermined proportions the rotary motion of $w$ for each revolution of $q$. The amount of rotary motion of $w$ is measured by a conventional counter C. Since the number of revolutions of $q$ in a given time is dependent upon the velocity of motor A, and, as has already been demonstrated, the speed of A depends upon the velocity of flow of water to the turbine B for any given position of its gates, and since the motion transmitted from $q$ to $w$ for each revolution of $q$ varies directly with the equivalent orifice of turbine B, as measured by its gate opening, it is evident that the readings of the counter C will be the integrated value of the quantity of water which flows through the turbine B.

Obviously this device can be used with steam and gas turbines, as well as with water turbines.

I claim:—

1. In an apparatus for measuring the fluid passing through a turbine, an element in the apparatus which is given rotary motion by the passage of the fluid, proportional to its velocity of flow, and varying axial reciprocation by the change in position of the turbine gates.

2. In a meter for fluid passing through a turbine, an element therein which is given motion of revolution by the fluid, proportional to its velocity of flow, and varying axial reciprocatory motion dependent upon the position of the turbine gates, and means connected with said element to integrate thereby the resultant of said velocity of flow and the amount of gate opening.

3. In an apparatus for measuring the amount of fluid passing through a turbine, an element in the apparatus which receives two motions, induced respectively by the velocity of the flow of the fluid and the opening of the turbine gate, and means by which the resultant produced by the said fluid velocity and the amount of the gate opening is integrated.

HENRY E. WARREN.

Witnesses:
R. L. ROBERTS,
FLORENCE A. COLLINS.